(12) United States Patent
Walforst (10) Patent No.: US 6,731,411 B1
(45) Date of Patent: *May 4, 2004

(54) BUSINESS MODEL ALGORITHM AND APPARATUS FOR CREATING AND EXECUTING ORIGINAL DOCUMENTS AT REMOTE LOCATIONS

(76) Inventor: Howard E. Walforst, P.O. Box 60160, Reno, NV (US) 89506-0160

( * ) Notice: Subject to any disclaimer, the term of this patent is extended or adjusted under 35 U.S.C. 154(b) by 518 days.

This patent is subject to a terminal disclaimer.

(21) Appl. No.: 09/609,504

(22) Filed: Jul. 3, 2000

(51) Int. Cl.[7] .......................... H04N 1/04; G06K 11/00; B42D 15/10
(52) U.S. Cl. .......................... 358/474; 250/556; 283/72
(58) Field of Search .................................. 358/400, 436, 358/403, 405; 200/556; 283/72

(56) References Cited

U.S. PATENT DOCUMENTS 5,354,001 A * 10/1994 Hasegawa ..................... 241/34
6,038,035 A * 3/2000 Wulforst ..................... 358/406

* cited by examiner

Primary Examiner—Edward Coles
Assistant Examiner—Jason Sherrill
(74) Attorney, Agent, or Firm—Herbert G. Schulze (57) ABSTRACT

A business model algorithm for creating a second "original" document of an original document from a first location to a second location by means of transmitting an electronic image of said document and printing the same at the second location, verifying the accuracy of the transmitted image, validating the transmitted ad printed copy and destroying the original document at the first location, and scanning, verifying, printing, comparing accuracy and validation of the transmitted copy, and a business model algorithm for electronic verification and execution of documents by a multiplicity of parties located at different locations from each other and from the location of the document.

4 Claims, 6 Drawing Sheets

BUSINESS MODEL ALGORITHM AND APPARATUS FOR CREATING AND EXECUTING ORIGINAL DOCUMENTS AT REMOTE LOCATIONS

CROSS REFERENCE TO RELATED PATENT APPLICATIONS

There are no presently pending patent applications filed by me related to the within application.

BACKGROUND OF THE INVENTION

I. Field of the Invention

This invention is in the general field of creation, execution, and transmission of documents and the like;

The invention is more particularly in the field of useful business model algorithms which accomplish the creation and/or substitution of electronically transmitted, verified, and executed documents, agreements, and the like in lieu of original hard copy documents, agreements, and the like.

The invention is also in the field of copying copyrighted material for use of a person at a location distant from where the copyrighted material exists, without having a duplicate copy or violation of the copyrighted material in existence;

The invention is further in the field of electronic meeting attendance and voting.

II. Description of the Prior Art

There has been considerable prior art in the general fields of document authentication and transmission. My U.S. Pat. No. 6,038,035 and the references therein might be considered by some to be appropriate prior art, as well as my U.S. Pat. No. 5,003,405 and the references therein.

There is limited prior art as to electronic attendance, participation, and voting at meeting and the like.

I have examined all of these matters and have come to the conclusion that while some of the matters presented can be in the art to be considered, that none of the art of which I am aware would suggest nor anticipate the inventions herein presented, except for my two patents.

Even though there are common features, as the inventor herein, my prior work did not anticipate nor suggest what I am now seeking to patent here. In fact, some of the items such as electronic execution of documents and electronic meeting attendance have not previously existed. With this understanding, I do not believe there is prior art as to the inventions herein presented.

SUMMARY OF THE INVENTION

My previously mentioned United States Patents describe unique methods and apparatus for substituting a verified document for an original document. Such a method and apparatus has a wide field of use for rapid delivery of an authenticated document copy which can be substituted for an original document with the contemporaneous destruction of the original leaving the authenticated copy as the only "original" document.

The present invention provides an updated, automated, efficient, and useful business method algorithm which makes for added speed, accuracy, and security in document execution and substitution. Additionally, the present invention provides a method and apparatus by which single copies of copyrighted material may be transmitted with simultaneous destruction of the material being transmitted so that unauthorized use of the copyright material is avoided.

In the present invention I have provided a means for insertion of a document into an apparatus in which it is secure and observable. The apparatus scans the document and then electronically transmits an exact image of the document to a like, or similar, apparatus at a different location. Verification of accuracy of transmission is by the printing of, and authenticating of, a copy from that image. When verified, the new document becomes the only original while the original which was scanned and transmitted and all images or other material from which a like document could be created are destroyed or deleted, thus leaving only one document which can be claimed to be the only proper original or substitute original.

My new step by step methods for secure document reproduction, validation, and electronic transmission and destruction outmodes all previous efforts in this field. By using this new algorithm the security, speed, and accuracy of document execution and substitution reaches a new height.

My new system for attending meetings and the like electronically will have very valuable uses. As is known, there are frequently important meetings with urgent issues to be decided which must be postponed, or whole bodies reorganized, due to illness or other absence of key members. Important legislation has even been lost or delayed due to members of political bodies being ill, or otherwise absent from a meeting. My new system can eliminate that problem.

Another important part of this invention is the alternate use of the internet and electronic mail in order to provide single original copies of a prior single original document at a location remote from the location of the single original document with complete verification of accuracy.

It is an object of this invention to provide business model algorithms for achieving document substitution and destruction for the purpose of insuring that at all times there is only one usable original document, while at the same time instantly being able to cause that one original to exist at any desired location;

Another object of this invention is to provide secure document substitution utilizing electronic transmission means;

Another object of this invention is to provide for virtual instantaneous document substitution and authentication with internet interactive authentication;

Another object of this invention is to provide means for transmittal of a substituted copyrighted document in such manner that there will be only one authorized copy of such copyrighted material in existence in order to avoid any possible copyright misuse due to a requirement to view such material at more than one location;

Another object of this invention is to provide a method for a multiplicity of parties at different locations electronically to execute a single original document at any given location even though none of the parties might be physically at the location of the document;

Another object of this invention is to establish a method, or algorithm, for allowing participation in meetings and discussion and voting by members of a body who may be unavailable due to illness or the like.

The foregoing objects and other objects and advantages of this invention will become apparent to those skilled in the art upon reading the description of a preferred embodiment which follows in conjunction with a review of the appended drawings.

DESCRIPTION OF A PREFERRED EMBODIMENT

An inventory of items bearing reference numerals in the drawings is:

| Numeral | Item |
| --- | --- |
| 10 | facsimile sending machine |
| 12 | document feed |
| 14 | document tray |
| 16 | shredder |
| 20 | document |
| 20a | document passing through shredder |
| 20b | shredded document |
| 22 | facsimile document |
| 30 | facsimile transmission medium |
| 40 | facsimile receiving and printing machine |
| 42 | facsimile output slot |
| 44 | facsimile output tray |
| 110 | computer |
| 110a | scanner |
| 110b | monitor |
| 112 | computer |
| 112a | printer |
| 120 | document |
| 120a | document being shredded |
| 120b | shredded document |
| 120c | document displayed on monitor |
| 120d | printed document |
| 130 | transmission net between computers |

FIGS. 1, 2, 5, and 6 are block diagrams of the steps or actions performed in the business model algorithms of this invention.

Figure 3:
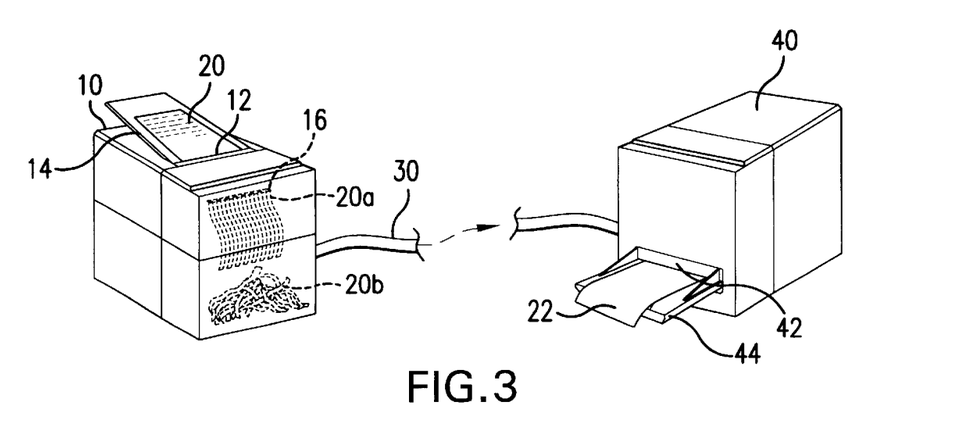
FIG. 3 is a schematic diagram of a document transport, destruct, and substitute path used in the algorithm of FIG. 1.
Figure 4:
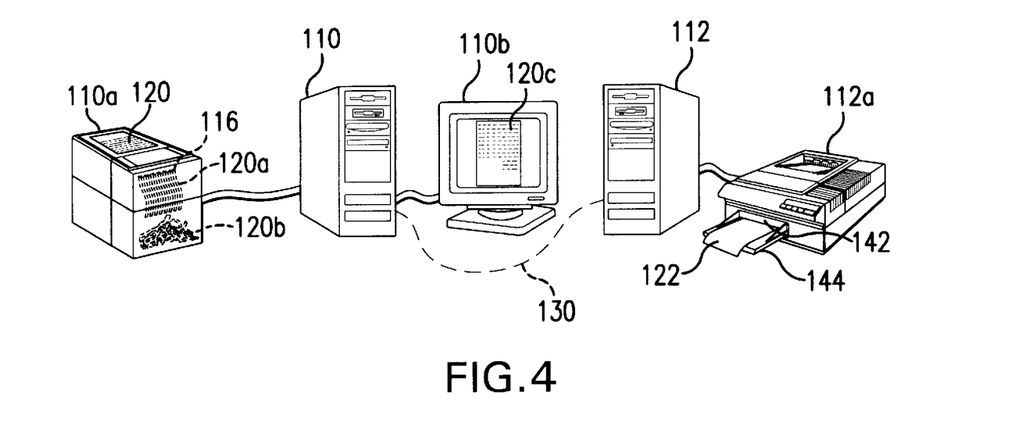
FIG. 4 is a schematic diagram of a document transport, destruct, and substitute path used in the algorithm of FIG. 2.

FIGS. 3 and 4 are basically schematic views of apparatus which can be used to practice the algorithms of this invention since the mechanical and other physical, electrical, electronic, and other details will be known to those skilled in the art. The necessary installations and actions can be assembled and performed readily by those skilled in the art when this entire specification has been read and understood.

Figure 1:
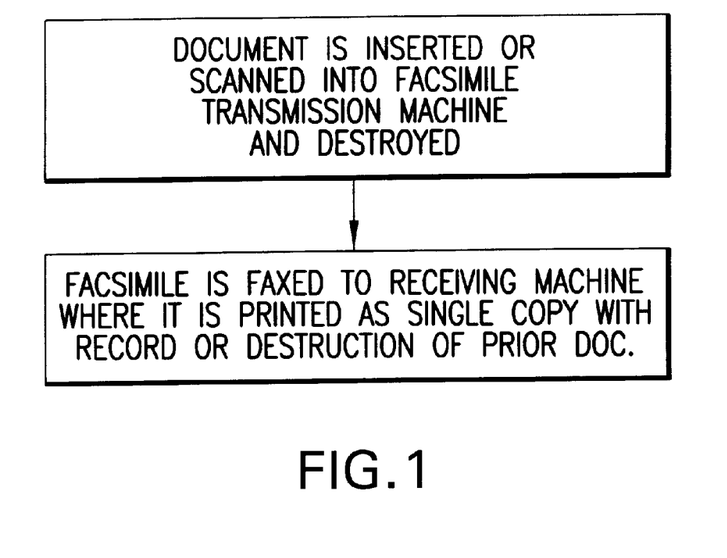
FIG. 1 is a block diagram showing a step by step business model algorithm of this invention.

FIGS. 1 and 3 are best viewed together for a complete understanding of the basic operations and equipment necessary.

A single original document 20 is placed on a document feeding tray 14 adjacent a feeding slot 12 on facsimile machine 10 or some other document scanner or the like. The machine 10 will be activated by dialing a telephone number, or by other activation means as will be understood by those skilled in the art. After the document 20 has been scanned and/or transmitted or the like, the document will continue into shredder 16 where it is shredded into strips or bits 20a, ultimately being reduced to shredded rubble 20b. At this point, the original document 20 no longer exists.

In the meantime, the image of the document 20 has either been stored within the machine 10 for later transmission, or it has already been transmitted over telephone network 30 or some other transmission system as will be known to those skilled in the art.

The image of the document will be received into facsimile machine 40 or other suitable equipment where it will be printed out automatically as document 22 received onto output tray 44 through output slot 42. The machine 40 will have been programmed so as to print each received image only once, with no memory of the document being allowed.

As will be understood by those skilled in the art this entire process can be totally secure and result in the substitution of a "new original" document at a place distant from the now non-existent "original original".

Alternatively each document may be retained in position until the final "new original" document 22 has been verified as being accurate with the destruction and deletion steps being delayed until such verification has been provided.

Figure 2:
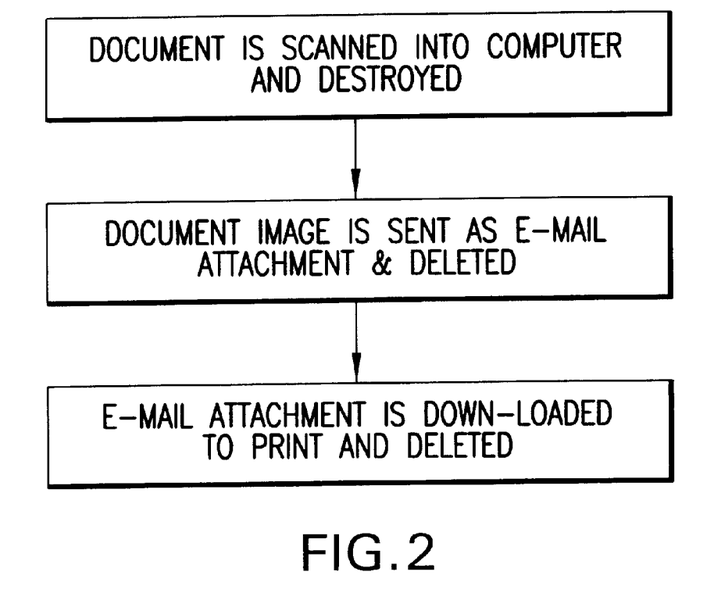
FIG. 2 is a block diagram of an alternate step by step business model algorithm of this invention.

FIGS. 2 and 4 should now be examined together. This is an alternate business model algorithm for the substitution of a verified "original" document at a distant location, which document is the only one of its kind, the "original original" having been destroyed at the time of electronic transmission of an image of the "original original".

An original document 120 is placed on a document scanner 110a or the like which communicates with computer or the like 110. The scanner 110a will be activated in a customary manner as will be understood by those skilled in the art. After the document 120 has been scanned the document 120 will continue into shredder 116 which is integral with, or otherwise cooperative with, the scanner in such manner that the scanner on a return after scanning can cause the document 120 to move into the shredder where it is shredded into strips or bits 120a, ultimately being reduced to shredded rubble 120b. At this point, the original document 120 no longer exists. All of these steps and actions will be understood and can be practiced by those killed in the art.

In the meantime, the image of the document 120 has either been stored within computer 110 for later transmission, or it has already been transmitted over internet or other network 130 or some other transmission system as will be known to those skilled in the art. As an example, the document image can be transmitted as an e-mail attachment.

The image of the document 120 will be received into the computer 112 or other suitable equipment. The document will be printed out automatically by printer 112a on command from computer 112. The document will be received onto output tray 144 through output slot 142. The computer 112 will have been programmed so as to print each received image only once, with no memory of the document being allowed. This prevents any unauthorized additional copies.

As in the previously described process, the copies and images may be retained until the accuracy of document 122 has been established before destruction or deletion of the "original original" and the various images, if desired.

As will be understood by those skilled in the art this entire process can be totally secure and result in the substitution of a "new original" document at a place distant from the now non-existent "original original" strictly in accordance with all requirements.

Figure 5:
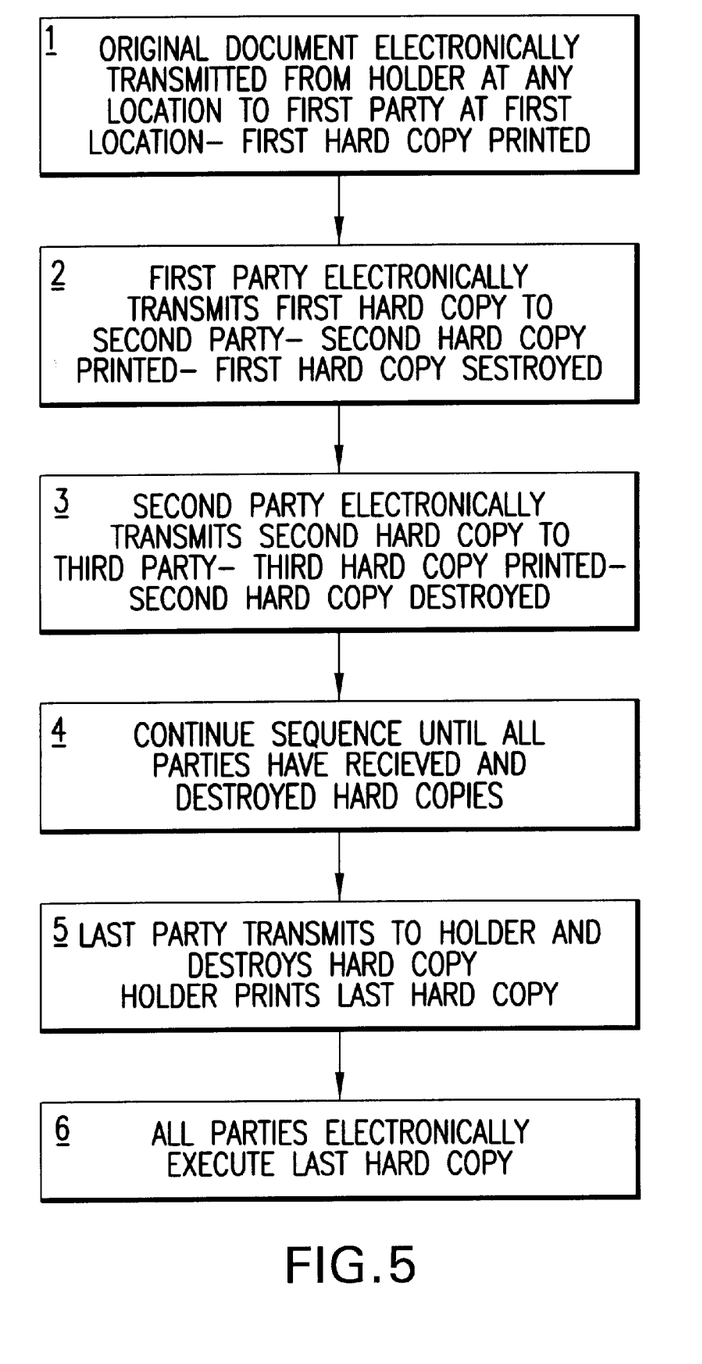
FIG. 5 is a block diagram of steps involved in creation of an original document electronically executed by a multiplicity of signatories at different locations to be held by a holder at a holder location.
Figure 6:
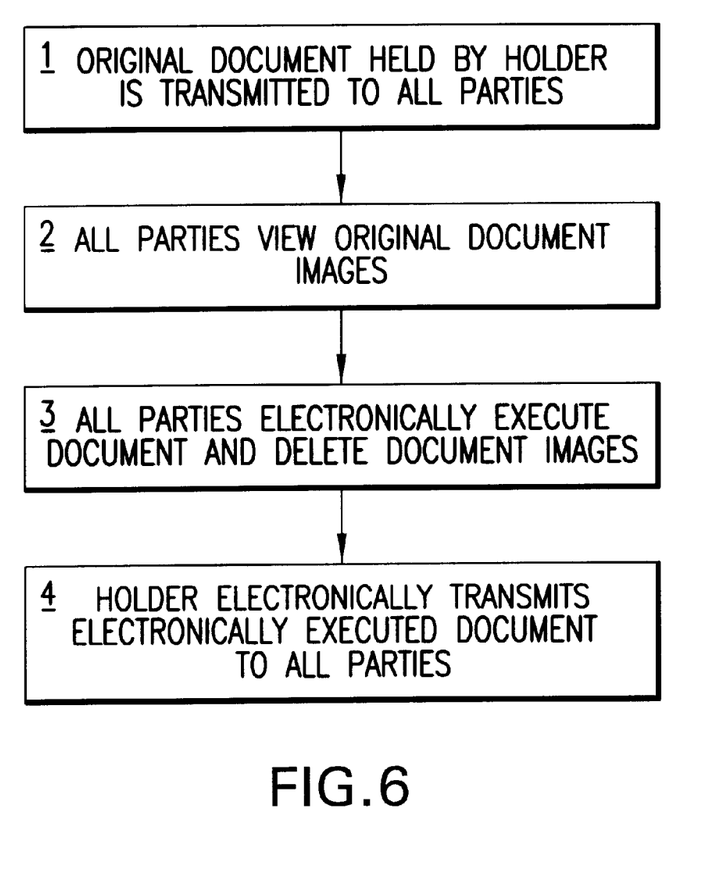
FIG. 6 is a block diagram of steps involved in an alternate system of creation of an original document electronically executed by a multiplicity of signatories at different locations to be held by a holder at a holder location.

FIGS. 5 and 6 reveal steps of my new business model algorithms utilizing the recently authorized electronic signatures for various parties at different locations to execute a single original document at a given location which may be entirely different from the location of any of the signatories.

FIG. 5 shows the steps of the algorithm wherein an original document in the possession of a "holder" is first transmitted to a first party who receives a first hard copy original. The first party forwards the document to a second party with the first hard copy original at the first party's location being destroyed. The second party will receive a second hard copy original. The second party will transmit the second hard copy original to a third party, after which the second hard copy original is destroyed. The process can be repeated as many times as necessary until all parties have received and passed on the document.

When all parties have received (whether it be only one or any given number) the "final hard copy original" will be in the custody of an appropriate final "holder". At this time, all parties may execute the document using electronic signatures.

It may be possible that each party may desire to maintain his/her hard copy rather than destroy it. Depending upon the rules adopted for any particular transaction this is permissible, with the only original signed hard copy original being the one in the possession of the holder.

The second party can be the last party, in which case the second party may execute and maintain the document or may execute and transmit the document back to the holder In the algorithm of figure six an original document is transmitted by an "holder" to all necessary parties. The parties will execute the original in the possession of the holder by electronic signature after which the holder may transmit a copy of the electronically executed document to each party.

Figure 7:
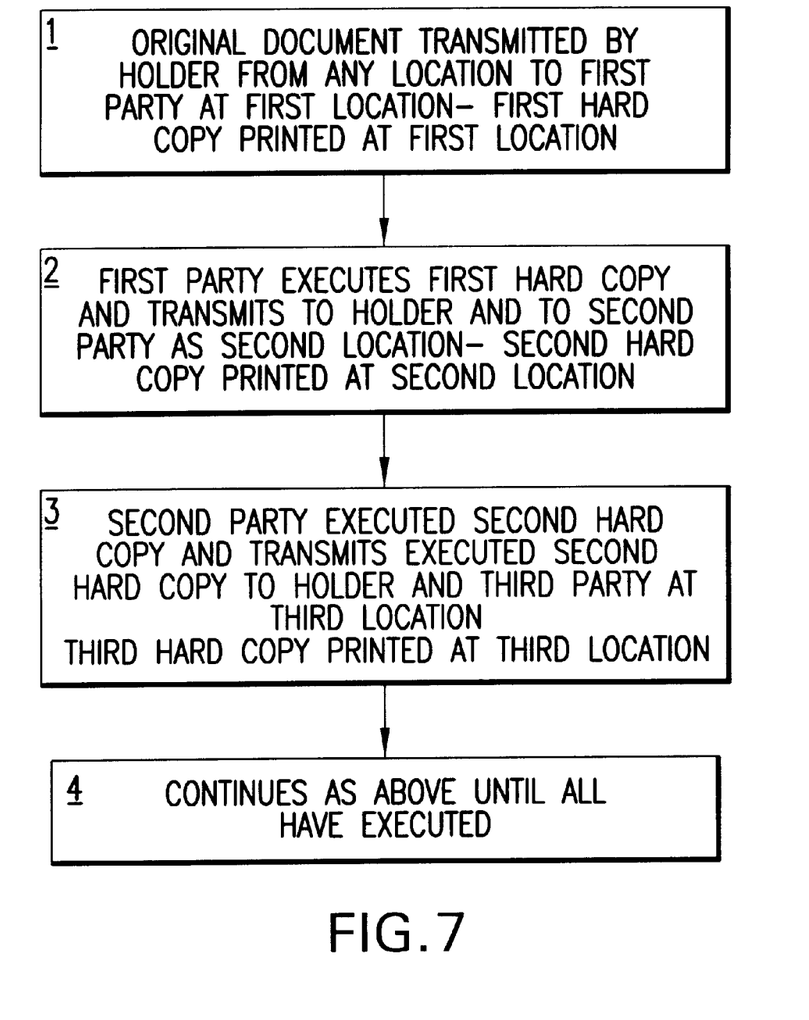
FIG. 7 is a block diagram of steps involved in another alternate system of creation of an original document electronically executed by a multiplicity of signatories at different locations to be held by a holder at a holder location.

FIG. 7 depicts the steps of my step by step method, or algorithm for sequential, simultaneous, or random execution of a document or the like by multiple parties. While I originally designed this for multiple parties, it is to be recognized that the first portion could be applicable to a single party.

As indicated in FIG. 7, an original document is electronically transmitted by a holder of the document to a first party to the document at a first location remote from that of the holder. A first hard copy is printed at the first location.

The first party executes the first hard copy and transmits it to a second party and to the holder. (Note: It could be that a single party, the first party would be the only party who will execute the document—in that event, the document will be executed and electronically returned to the holder).

The second party prints a second hard copy of the document, which will now bear the signature or other evidence of execution by the first party. The second party executes the second hard copy and electronically transmits it to a third party and to the holder. The process continues until the latest hard copy bears evidence of execution by all parties.

In practicing this algorithm, the holder receives an electronic copy of each new document showing execution by yet another party. In this manner, the holder is alerted, and will know exactly which party is involved, in the event one party does not promptly execute the document. Until I devised this system, when execution of a document was delayed, it was sometime a difficult task to determine where the document was and what the cause of the delay was.

In an alternate to the system of FIG. 7, the holder sends an electronic copy of the document to each party, and each merely executes electronically and returns to the holder. In this variation, once all the counterparts have been executed the execution is complete. This is not deemed as appropriate by many persons who desire to see one complete document. Additionally, it may be that execution in counterparts is not allowed.

Figure 8:
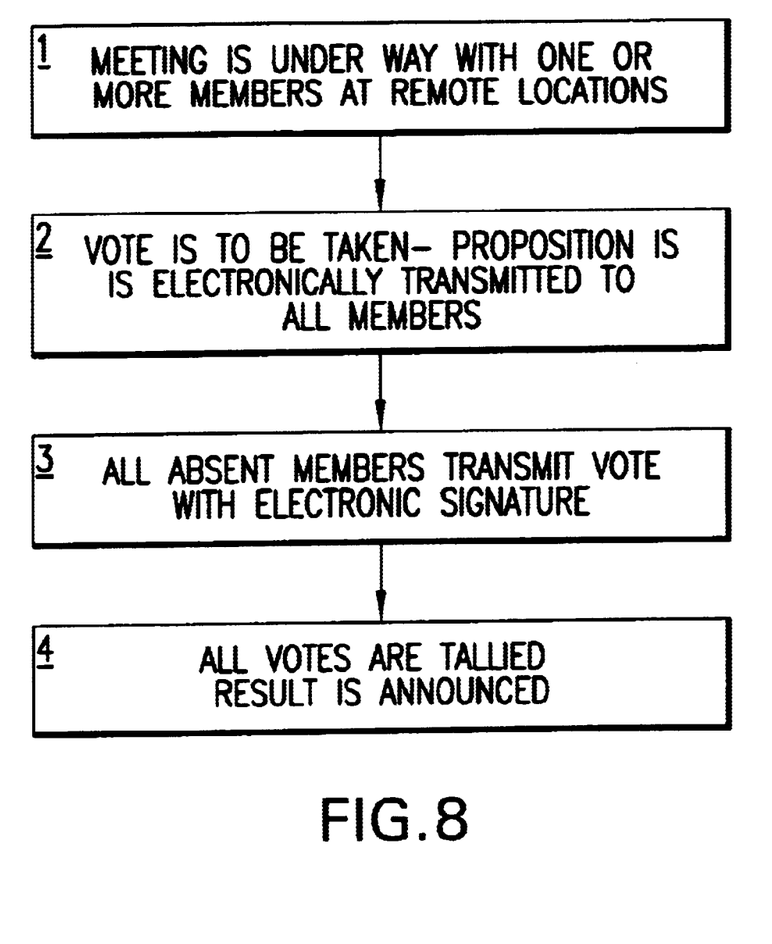
FIG. 8 is a block diagram of the steps involved in my new algorithm for electronic attendance and voting at meetings of elected, or other, bodies or organizations.

FIG. 8 may seem to some to be at complete variance to the basic theme of this invention. However, that is not true as I consider attendance at a meeting as somewhat akin to the execution of a document in that various propositions may be voted upon, the like. In that respect it is logical to include it in this application.

In today's high pressure business mode, there are occasions when all necessary or proper participants may be unable to attend meetings physically. Yet there are numerous occasions when the failure to attend can amount to a near dereliction of duty. For example, elected officials such as members of congress should participate in meeting and votes in order that the interests of their constituents are properly represented. If a member is absent it may be that the basic rights of constituents have been violated.

In my method, a member of a body who is unable to attend a meeting will be able to be contacted electronically and cast votes, or otherwise participate electronically with verification by electronic signature.

I have made reference to shredding of documents for destruction thereof, to electronic signatures, and other such matters. It is to be understood that destruction of documents could be by burning or other means; signature could be by mark before witnesses; and other such commonly know alternatives may be employed without departing from the teachings and desired disclosure herein. In all cases, reasonable equivalents are meant to be included within any definitions given.

In the claims which follow I may fail to claim every patentable feature of this invention. If that should happen, it will be due to inadvertence and not to be considered an abandonment nor dedication of such feature. In such event, upon discovering any such failure to claim I shall immediately seek to establish such claim by re-issue or other suitable procedure.

While the embodiments of this invention shown and described are fully capable of achieving the objects and advantages desired, it is to be understood that such embodiments have been shown and described for purposes of illustration only and not for purposes of limitation.

I claim:

1. An algorithm for providing a legally usable and authenticated document in lieu of an original document comprising: scanning an original document at a first location; destroying the original document; impressing the scanned original document image onto an electronic storage medium at the first location; transmitting the scanned original document image over electronic transmission means to an electronic storage medium at a second location; deleting the scanned original document image from the electronic storage medium at the first location; printing a single copy of the original document image at the second location; and deleting the scanned original document image from the electronic storage medium at the second location.

2. The algorithm of claim 1 wherein at each step of the algorithm the accuracy of the execution of the preceding step is verified prior to the destruction or deletion of the document or image.

3. The algorithm of claim 1 wherein after scanning said original document at said first location said original document is maintained in a secure environment until authorization is received from the second location to destroy said original document.

4. A method of providing a properly usable copyrighted document for use by a single user at a location remote from the location of the original copyrighted material comprising:

scanning the original copyrighted material by a computer scanner at a first location; verifying the accuracy of the scanned information at said first location; transmitting the scanned, copyrighted information by first computer means at the first location to second computer means at a second location; printing the copyrighted information so transmitted at said second location; verifying the accuracy of the printed copyrighted document at the second location; and, after verifying accuracy of the printed document at the second location, simultaneously releasing said document for use while destroying the original copyrighted document at said first location.

* * * * *